US012739778B2

(12) United States Patent
Tao

(10) Patent No.: US 12,739,778 B2
(45) Date of Patent: Sep. 15, 2026

(54) POSITIONING MEASUREMENT METHOD, COMMUNICATION DEVICE, AND STORAGE MEDIUM

(71) Applicant: BEIJING XIAOMI MOBILE SOFTWARE CO., LTD., Beijing (CN)

(72) Inventor: Xuhua Tao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 304 days.

(21) Appl. No.: 18/294,525

(22) PCT Filed: Aug. 2, 2021

(86) PCT No.: PCT/CN2021/110152
§ 371 (c)(1),
(2) Date: Feb. 1, 2024

(87) PCT Pub. No.: WO2023/010258
PCT Pub. Date: Feb. 9, 2023

(65) Prior Publication Data
US 2024/0349224 A1 Oct. 17, 2024

(51) Int. Cl.
*H04W 64/00* (2009.01)
*H04L 5/00* (2006.01)
*H04W 68/00* (2009.01)

(52) U.S. Cl.
CPC .......... *H04W 64/00* (2013.01); *H04L 5/0048* (2013.01); *H04W 68/005* (2013.01)

(58) Field of Classification Search
CPC ..... H04L 5/0051; H04L 5/0048; H04L 5/001; H04L 5/0098; H04L 5/0094; H04L 25/0226; H04L 25/0224; H04W 72/23; H04W 76/27; H04W 64/00; H04W 72/21; H04W 24/10; H04W 24/02; H04W 74/006; H04B 17/328; H04B 7/063; H04B 7/0413; H04B 17/318; H04B 7/0626
See application file for complete search history.

(56) References Cited

U.S. PATENT DOCUMENTS 12,526,877 B2 * 1/2026 Quan .................... H04W 76/30
2020/0162289 A1 * 5/2020 Ahn ...................... H04L 5/0053
2024/0036150 A1 * 2/2024 Fresia .................... H04W 4/50
(Continued)

FOREIGN PATENT DOCUMENTS

CN 111343567 A 6/2020
CN 111586855 A 8/2020
WO WO 2021119127 A1 6/2021

OTHER PUBLICATIONS

PCT/CN2021/110152 International Search Report dated Apr. 25, 2022, 2 pages.
(Continued)

*Primary Examiner* — Olumide Ajibade Akonai
(74) *Attorney, Agent, or Firm* — Cozen O'Connor

(57) ABSTRACT

A positioning measurement method may be performed by a terminal device in a cellular network. The terminal device transmits an uplink SRS (sounding reference signal), according to SRS resource configuration configured by a service network device for the terminal device to perform an SRS-based positioning measurement in an inactive state, such that the serving network device and a neighboring network device perform SRS-based positioning measurement.

15 Claims, 6 Drawing Sheets

(56) References Cited

U.S. PATENT DOCUMENTS

2024/0168121 A1* 5/2024 Manolakos ........... G01S 5/0018
2024/0340839 A1* 10/2024 Ghimire ................ H04L 5/0048

OTHER PUBLICATIONS

Huawei et al. "Discussion on positioning in RRC_INACTIVE" 3GPP TSG RAN WG2 #113bis-e, R2-2103537, Apr. 2021, 6 pages.
Huawei et al. "Discussion on positioning in RRC_INACTIVE" 3GPP TSG AN WG2 #114-e, R2-2105216, May 2021, 5 pages.
Huawei et al. "Positioning enhancement in Rel-17" 3GPP TSG RAN WG1 Meeting #103-e, R1-2007577, Oct.-Nov. 2020, 11 pages.
Huawei et al. [Post112-e][609][POS] Positioning support in RRC_ IDLE and RRC_INACTIVE (Huawei), 3GPP TSG-RAN WG2 Meeting #113-e, R2-2101230, Jan.-Feb. 2021, 16 pages.
VIVO " Discussion on UL positioning in RRC_INACTIVE" 3GPP TSG RAN WG2#116-e, R2-2109980, Nov. 2021, 4 pages.
Chinese Patent Application No. 202180002366.0, Office Action with English translation dated Jul. 15, 2025, 20 pages.
European Patent Application No. 21952168.9, Search Report dated Jul. 9, 2024, 13 pages.
Huawei et al., "[Post112-e][609][POS] Positioning support in RRC_ IDLE and RRC_Inactive", 3GPP TSG-RAN WG2 Meeting #113-e, R2-201, Jan. 2021, 28 pages.
CATT, "Discussion on RRC_INACTIVE State Positioning", 3GPP TSG-RAN WG3#112-e, R3-211821, May 2021, 4 pages.
CATT, "Fl Summary #2 for Potential Positioning Enhancements", 3GPP TSG RAN WG1 Meeting #103-e, R1-2009366, Oct. 2020, 71 pages.

* cited by examiner

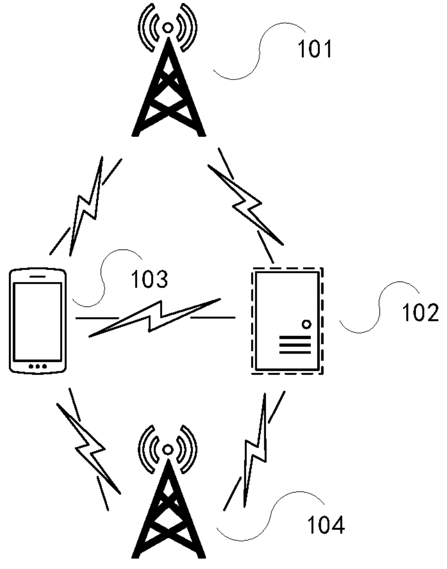

Fig. 1 transmitting an uplink sounding reference signal (SRS) signal, according to an SRS resource configuration configured by a service network device for the terminal device to perform an SRS-based positioning measurement in an inactive state, so that the service network device and an adjacent service network device perform the SRS-based positioning measurement

S201

Fig. 2 receiving a sounding reference signal (SRS) resource configuration transmitted by a service network device

S501 transmitting the SRS resource configuration to the terminal device, so that the terminal device transmits an uplink SRS signal according to the SRS resource configuration in the inactive state

S502

POSITIONING MEASUREMENT METHOD, COMMUNICATION DEVICE, AND STORAGE MEDIUM

CROSS-REFERENCE TO RELATED APPLICATION

This application is the US national phase application of International Application No. PCT/CN2021/110152, filed on Aug. 2, 2021, the entire contents of which are incorporated herein by reference for all purposes.

TECHNICAL FIELD

The disclosure relates to the field of wireless communication technologies, and in particular, to a positioning measurement method, a communication device and a storage medium.

BACKGROUND

In an existing positioning measurement process of a cellular network, a terminal device is only supported in performing positioning measurements in a state of being connected to the cellular network. However, the terminal device is mostly in an inactive state such that the cellular network is unable to perform positioning measurement on the terminal device. Therefore, it is necessary to improve the positioning measurement and process of the terminal device when it is in the inactive state.

SUMMARY

In a first aspect, embodiments of the present disclosure provide a positioning measurement method applied to a terminal device. The method includes: transmitting an uplink sounding reference signal (SRS) signal, according to an SRS resource configuration configured by a service network device for the terminal device to perform an SRS-based positioning measurement in an inactive state, so that the service network device and an adjacent service network device perform the SRS-based positioning measurement.

In a second aspect, embodiments of the present disclosure provide a positioning measurement method, applied to a location management unit (LMF). The method includes: receiving a sounding reference signal (SRS) resource configuration transmitted by a service network device, wherein the SRS resource configuration is configuration information configured by the service network device for a terminal device to perform an SRS-based positioning measurement in an inactive state; and transmitting the SRS resource configuration to the terminal device, so that the terminal device transmits an uplink SRS signal according to the SRS resource configuration in the inactive state.

In a third aspect, embodiments of the present disclosure provide a positioning measurement method applied to a service network device. The method includes: configuring a sounding reference signal (SRS) resource configuration for a terminal device to perform an SRS-based positioning measurement in an inactive state; transmitting the configured SRS resource configuration to a location management unit (LMF), so that the LMF transmits the SRS resource configuration to the terminal device, and the terminal device transmits an uplink SRS signal according to the SRS resource configuration; performing the SRS-based positioning measurement.

In a fourth aspect, embodiments of the present disclosure provide a communication device, including a processor and a memory. The memory stores a computer program, and the processor is configured to execute the computer program stored in the memory, to enable the communication device to perform the method described in the first aspect above.

In a fifth aspect, embodiments of the present disclosure provide a communication device, including a processor and a memory. The memory stores a computer program, and the processor is configured to execute the computer program stored in the memory, to enable the communication device to perform the method described in the second aspect above.

In a sixth aspect, embodiments of the present disclosure provide a communication device, including a processor and a memory. The memory stores a computer program, and the processor is configured to execute the computer program stored in the memory, to enable the communication device to perform the method described in the third aspect above.

BRIEF DESCRIPTION OF THE DRAWINGS

In order to provide a clearer explanation of the technical solution in embodiments of the present disclosure or in the background, the accompanying drawings required in the embodiments of the present disclosure or in the background will be explained below.

FIG. 1 is a schematic diagram of an architecture of a communication system provided in embodiments of the present disclosure.

FIG. 2 is a schematic flowchart of a positioning measurement method applied to a terminal device as provided in an embodiment of the present disclosure.

DETAILED DESCRIPTION

Figure 3:
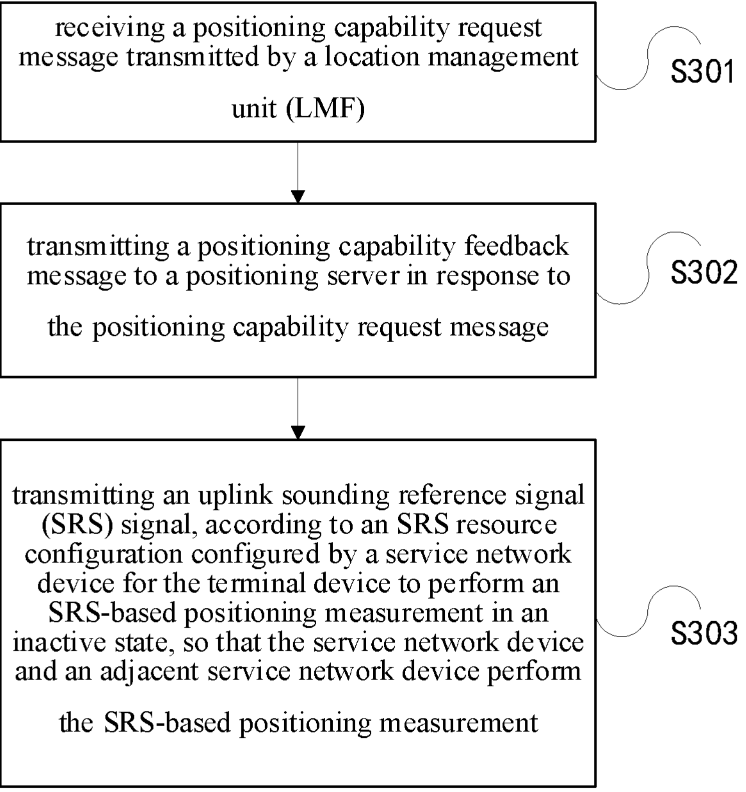
FIG. 3 is a schematic flowchart of another positioning measurement method provided in an embodiment of the present disclosure.

The following describes in detail embodiments of the present application, examples of which are shown in the accompanying drawings, where identical or similar labels throughout represent identical or similar components or components with identical or similar functions. The embodiments described below with reference to the accompanying drawings are exemplary and intended to explain the present application, but cannot be understood as limitations to the present application. In the description of this application, unless otherwise specified, "/" represents or. For example, A/B can represent A or B. "and/or" herein is only a description of the association relationship between related objects, indicating that there can be three types of relationships, such as A and/or B, which can represent the existence of A alone, the coexistence of A and B, and the existence of B alone.

In order to better understand the positioning measurement method disclosed in embodiments of the present disclosure, the communication system applicable to the embodiments of the present disclosure will be described below.

Please refer to FIG. 1, which is a schematic diagram of an architecture of a communication system provided in embodiments of the present disclosure. The communication system may include, but is not limited to, a service network device, an LMF (location management unit), a terminal device, and an adjacent network device. The number and form of devices shown in FIG. 1 are for illustrative purposes only and do not constitute a limitation on the embodiments of the present disclosure. The communication system shown in FIG. 1 includes one service network device 101, one LMF 102, one terminal device 103, and one adjacent network device 104 as an example.

It should be noted that the technical solutions of embodiments of the present disclosure can be applied to various communication systems, for example, long term evolution (LTE) systems, 5th generation (5G) mobile communication systems, 5G new radio (NR) systems, or other new mobile communication systems in the future.

The service network device 101 in embodiments of the present disclosure can be understood as a network device that provides services for the terminal device 103. The service network device 101 is an entity on the network side used for transmitting or receiving signals. For example, the service network device 101 may be an evolved NodeB (eNB), a transmission reception point (TRP), or other base stations in future mobile communication systems. The embodiments of this disclosure do not limit the specific technology and device form adopted by the service network device. The service network device provided in embodiments of the present disclosure may be composed of a central unit (CU) and distributed units (Dus), where the CU may also be referred to as a control unit. The CU-DU structure can separate protocol layers of the service network device, such as the base station, with some protocol layer functions placed in the CU for centralized control, and some or all of remaining protocol layer functions distributed in the DUs, wherein the DUs are centrally controlled by the CU.

The adjacent network device 104 in embodiments of the present disclosure is a network device adjacent to the service network device. The adjacent network device 104 is an entity on the network side used for transmitting or receiving signals. For example, the adjacent network device 104 may be an evolved NodeB (eNB), a transmission reception point (TRP), or other base stations in future mobile communication systems. The embodiments of this disclosure do not limit the specific technology and device form adopted by the adjacent network device. The adjacent network device provided in embodiments of the present disclosure may be composed of a central unit (CU) and distributed units (DUs), where the CU may also be referred to as a control unit. The CU-DU structure can separate protocol layers of the service network device, such as the base station, with some protocol layer functions placed in the CU for centralized control, and some or all of remaining protocol layer functions distributed in the DUs, wherein the DUs are centrally controlled by the CU.

102 in embodiments of the present disclosure is a location management unit (LMF). The terminal device 103 in embodiments of the present disclosure is an entity on the user side for receiving or transmitting signals, such as a mobile phone. The terminal device may also be referred to as a terminal, a user equipment (UE), a mobile station (MS), a mobile terminal (MT), etc. The terminal device may be a car with communication capabilities, a smart car, a mobile phone, a wearable device, a tablet, a computer with wireless transmission and reception capabilities, a virtual reality (VR) terminal device, an augmented reality (AR) terminal device, a wireless terminal device in self-driving, a wireless terminal device in remote medical surgery, a wireless terminal device in smart grid, a wireless terminal device in transportation safety, a wireless terminal device is smart city, or a wireless terminal device in smart home. The embodiments of this disclosure do not limit the specific technology and device form adopted by the terminal device.

It can be understood that the communication system described in the embodiments of this disclosure is for a clearer explanation of the technical solution of the embodiments of this disclosure, and does not constitute a limitation on the technical solution provided in the embodiments of this disclosure. As ordinary technical personnel in this field know, with the evolution of the system architecture and the emergence of new business scenarios, the technical solution provided in the embodiments of this disclosure is also applicable to similar technical problems.

The following provides a detailed introduction to a positioning measurement method, a communication device, and a storage medium provided in this application, combined with the accompanying drawings.

Please refer to FIG. 2, which is a schematic flowchart of a positioning measurement method provided in an embodiment of the present disclosure. It should be noted that the positioning measurement method of the present embodiment can be applied to terminal devices. As shown in FIG. 2, this method may include but is not limited to the following steps.

At step S201, an uplink SRS signal is transmitted, according to SRS (sounding reference signal) resource configuration configured by a service network device for a terminal device to perform SRS-based positioning measurement in an inactive state, so that the service network device and an adjacent service network device perform the SRS-based positioning measurement.

Optionally, the SRS resource configuration is configured by the service network device, which means that the service network device can configure the SRS resource configuration of the terminal device to perform the SRS-based positioning measurement in the inactive state, so that the terminal device can transmit the uplink SRS signal according to the SRS resource configuration configured by the service network device.

In an implementation, the SRS resource configuration is configured by the service network device to the terminal device through a radio resource control (RRC) connection release message when the terminal device is in a connected state. That is to say, when the terminal device is in a connected state, the service network device can configure the SRS resource configuration information to the terminal device through the RRC connection release message before the RRC connection is released, so that the terminal device can transmit the uplink SRS signal based on the SRS resource configuration, thereby enabling the service network device and the adjacent service network device to perform the SRS-based positioning measurement.

In another implementation, the SRS resource configuration is configured by the service network device and transmitted to the location management unit (LMF), and then transmitted by the LMF to the terminal device. For example, when the terminal device is in the inactive state, the service network device can transmit the SRS resource configuration to the terminal device through the LMF, so that the terminal device can transmit the uplink SRS signal based on the SRS resource configuration, thereby enabling the service network device and the adjacent service network device to perform the SRS-based positioning measurement.

By implementing this embodiment, the terminal device can transmit the uplink SRS signal, according to the SRS resource configuration configured by the service network device for the terminal device to perform SRS-based positioning measurement in the inactive state, so that the service network device and the adjacent service network device perform the SRS-based positioning measurement. This enables cellular network positioning technology to support the terminal device to perform uplink positioning measurement in the inactive state, which can improve the efficiency and performance of cellular network positioning measurement.

Please refer to FIG. 3, which is a schematic flowchart of another positioning measurement method provided in an embodiment of the present disclosure. It should be noted that the positioning measurement method of the present embodiment can be applied to a terminal device. As shown in FIG. 3, this method may include but is not limited to the following steps.

At step S301, a positioning capability request message transmitted by an LMF is received.

At step S302, a positioning capability feedback message is transmitted to a positioning server in response to the positioning capability request message, in which the positioning capability feedback message includes positioning measurement capability information supported by the terminal device and state indication information of the terminal device.

Optionally, when the terminal device receives the positioning capability request message transmitted by the LMF, it can reply to the positioning server with the supported positioning measurement capability through the positioning capability feedback message. The positioning capability feedback message contains the state indication information of the terminal device, which can be understood as the current state of the terminal device, such as idle state/inactive state/connected state.

At step S303, an uplink SRS signal is transmitted, according to SRS resource configuration configured by a service network device for the terminal device to perform SRS-based positioning measurement in an inactive state, so that the service network device and an adjacent service network device perform the SRS-based positioning measurement.

In this embodiment of the present disclosure, step S303 can be implemented in any way in respective embodiments of the present disclosure, and the embodiments of the present disclosure do not limit or elaborate on this.

It should be noted that the actual execution order of steps S301, S302, and S303 mentioned above does not necessarily follow the order described above. That is to say, the steps described in steps S301, S302, and S303 above are for the convenience of understanding and description by those skilled in the art, and the actual execution order does not necessarily follow the order described above.

By implementing this embodiment, when the terminal device replies with the supported positioning measurement capability to the positioning server, it carries the state indication information of the terminal device in the positioning capability feedback message, so that the positioning server can know the current state of the terminal device.

Figures 4, 5:
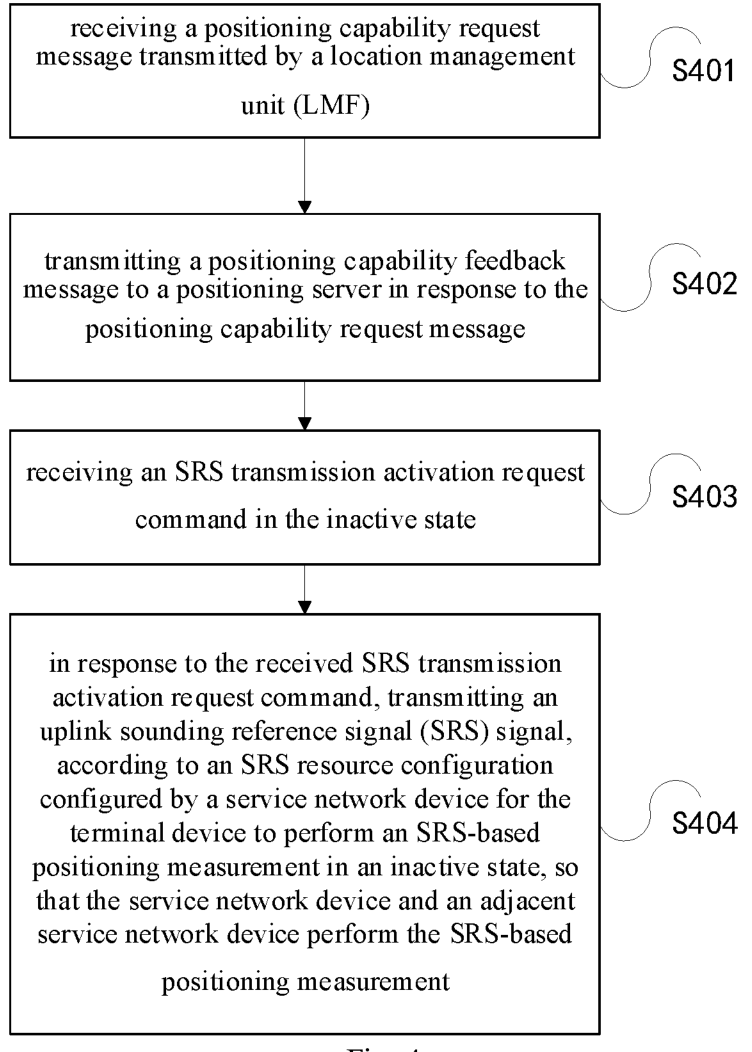
FIG. 4 is a schematic flowchart of yet another positioning measurement method provided in an embodiment of the present disclosure.
FIG. 5 is a schematic flowchart of a positioning measurement method a location management unit (LMF) provided in an embodiment of the present disclosure.

In order to avoid resource waste, the terminal device can transmit the uplink SRS signal according to the configured SRS resource configuration after receiving the SRS transmission activation request command. Optionally, FIG. 4 is a schematic flowchart of a positioning measurement method provided in an embodiment of the present disclosure. It should be noted that the positioning measurement method of the present embodiment can be applied to a terminal device. As shown in FIG. 4, this method may include but is not limited to the following steps.

At step S401, a positioning capability request message transmitted by an LMF is received.

In embodiments of the present disclosure, step S401 may be implemented in any way of respective embodiments of the present disclosure, and the embodiments of the present disclosure do not limit or elaborate on this.

At step S402, a positioning capability feedback message is transmitted to a positioning server in response to the positioning capability request message, in which the positioning capability feedback message includes positioning measurement capability information supported by the terminal device and state indication information of the terminal device.

In embodiments of the present disclosure, step S402 may be implemented in any way of respective embodiments of the present disclosure, and the embodiments of the present disclosure do not limit or elaborate on this.

At step S403, an SRS transmission activation request command is received in the inactive state.

It should be noted that in an implementation, the SRS transmission activation request command refers to activating the UE's function of transmitting SRS signals, which is used to trigger the UE to transmit the uplink SRS signal. The SRS transmission activation request command can be implemented in various ways. For example, the SRS transmission activation request command may be transmitted by the location management unit (LMF) to the terminal device, or a SRS-based positioning measurement request may be transmitted to the service network device by the location management unit (LMF), so that the service network device can carry the SRS transmission activation request command in a paging messages. Below will provide examples of these two methods.

As an example, the SRS transmission activation request command transmitted by the location management unit (LMF) is received. That is to say, the location management unit (LMF) transmits the SRS transmission activation request command to the terminal device, so that the terminal device can transmit the uplink SRS signal according to the configured SRS resource configuration after receiving the SRS transmission activation request command, avoiding resource waste.

As another example, a first paging message transmitted by the service network device is received, the first paging message carrying an SRS transmission activation request command. The first paging message is transmitted by the service network device after receiving the SRS-based positioning measurement request transmitted by the location management unit (LMF). That is to say, the location management unit (LMF) transmits the SRS-based positioning measurement request to the service network device. The service network device carries the SRS transmission activation request command in the paging message, so that the terminal device can transmit the uplink SRS signal according to the configured SRS resource configuration after receiving the paging message, avoiding resource waste.

At step S404, in response to the received SRS transmission activation request command, the uplink SRS signal is transmitted, according to SRS resource configuration configured by the service network device for the terminal device to perform SRS-based positioning measurement in an inactive state, so that the service network device and an adjacent service network device perform the SRS-based positioning measurement.

Optionally, after receiving the SRS transmission activation request command, the uplink SRS signal is transmitted based on the SRS resource configuration configured by the service network device for the terminal device to perform SRS-based positioning measurement in the inactive state. The Location Management Unit (LMF) transmits the SRS-based positioning measurement request and SRS resource configuration information to the service network device and the adjacent network device. The service network device and adjacent service network device perform the SRS-based positioning measurements according to the SRS resource configuration information, and report the measurement result to the positioning server. From this, it can be seen that the embodiments of this disclosure can enable cellular network positioning technology to support the terminal device to perform uplink positioning measurement in the inactive state, thereby improving the efficiency and performance of cellular network positioning measurement, and also avoiding resource waste.

In some embodiments of the present disclosure, the terminal device may also receive an SRS transmission deactivation request command, and in response to the received SRS transmission deactivation request command, stop transmitting the uplink SRS signal. For example, after completing the measurement, the terminal device receives the SRS transmission deactivation request command to stop transmitting the uplink SRS signal, thereby avoiding resource waste.

It should be noted that in embodiments of the present disclosure, the SRS transmission deactivation request command can be implemented in various ways. For example, the SRS transmission deactivation request command can be transmitted to the terminal device by the location management unit, or a measurement stop command can be transmitted to the service network device by the location management unit, and the service network device can carry the SRS transmission deactivation request command through the paging message. The following will provide examples of these two implementation methods.

As an example of a possible implementation, receiving the SRS transmission deactivation request command includes: receiving the SRS transmission deactivation request command transmitted by the location management unit (LMF). That is to say, the location management unit (LMF) transmits the deactivation request command to the terminal device, so that the terminal device stops transmitting the uplink SRS signal after receiving the deactivation request command, avoiding resource waste.

As an example of a possible implementation, receiving the SRS transmission deactivation request command includes: receiving a second paging message transmitted by the service network device, the second paging message carrying the SRS transmission deactivation request command; wherein, the second paging message is transmitted by the service network device after receiving the measurement stop command transmitted by the location management unit (LMF). That is to say, the location management unit (LMF) transmits the measurement stop command to the service network device, and the service network device carries the deactivation request command in the paging message, so that the terminal device stops transmitting the uplink SRS signal after receiving the deactivation request command, avoiding resource waste.

It should be noted that the actual execution order of steps S401, S402, S403, and S404 mentioned above does not necessarily follow the order described above. That is to say, the steps described in S401, S402, S403, and S404 are for the convenience of understanding by those skilled in the art and for description, and the actual execution order does not necessarily follow the order described above.

It can be understood that the above embodiments describe the implementation of the positioning measurement method of the present disclosure from the perspective of the terminal device. Embodiments of the present disclosure also propose another positioning measurement method, and the implementation of this positioning measurement method will be described below from the location management unit (LMF). Please refer to FIG. 5, which is a schematic flowchart of another positioning measurement method provided in an embodiment of the present disclosure. It should be noted that the positioning measurement method of the present embodiment can be applied to the location management unit (LMF). As shown in FIG. 5, the positioning measurement method may include but is not limited to the following steps.

At step S501, a sounding reference signal (SRS) resource configuration transmitted by a service network device is received, in which the SRS resource configuration includes configuration information configured by the service network device for a terminal device to perform SRS-based positioning measurement in an inactive state.

At step S502, the SRS resource configuration is transmitted to the terminal device, so that the terminal device transmits an uplink SRS according to the SRS resource configuration in the inactive state.

It can be understood that the SRS resource configuration is configured by the service network device, which means that the service network device can configure the SRS resource configuration of the terminal device to perform the SRS-based positioning measurement in the inactive state, so that the terminal device can transmits the uplink SRS signal according to the SRS resource configuration configured by the service network device.

In embodiments of the present disclosure, the SRS resource configuration configured by the service network device can be transmitted to the terminal device through the location management unit (LMF) in a transparent manner. For example, when the terminal device is in an inactive state, the service network device can transmit the SRS resource configuration to the terminal device through the location management unit (LMF) in a transparent manner, so that the terminal device can transmit the uplink SRS signal based on the SRS resource configuration, thereby enabling the service network device and adjacent service network device to perform the SRS-based positioning measurement.

By implementing this embodiment, the location management unit (LMF) can transmit the SRS resource configuration configured by the service network device to the terminal device, enabling the terminal device to transmit the uplink SRS signal according to the SRS resource configuration in the inactive state. This enables cellular network positioning technology to support the terminal device in performing uplink positioning measurement in the inactive state, thereby improving the efficiency and performance of cellular network positioning measurements.

Figures 6, 7:
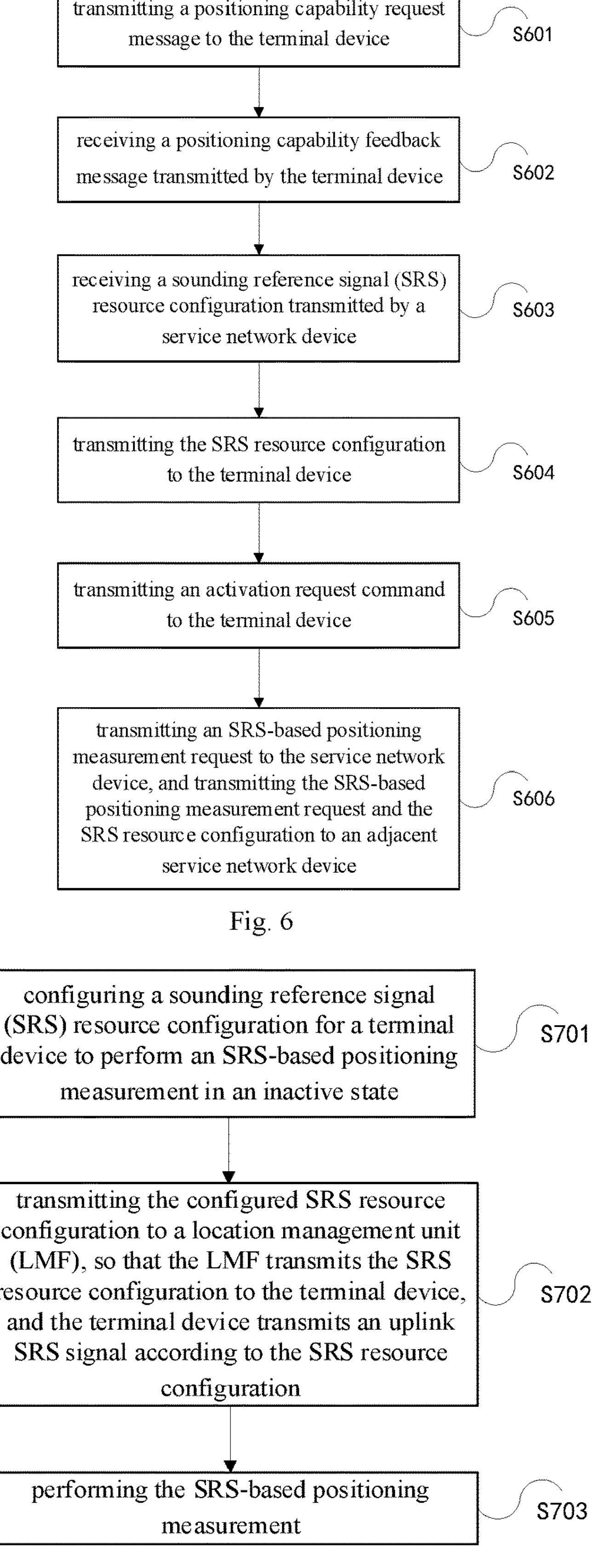
FIG. 6 is a schematic flowchart of another positioning measurement method provided in an embodiment of the present disclosure.
FIG. 7 is a schematic flowchart of a positioning measurement method service network device provided in an embodiment of the present disclosure.

Please refer to FIG. 6, which is a schematic flowchart of another positioning measurement method provided in an embodiment of the present disclosure. It should be noted that the positioning measurement method of the present embodiment can be applied to a location management unit (LMF). As shown in FIG. 6, the positioning measurement method may include but is not limited to the following steps.

At step S601, a positioning capability request message is transmitted to a terminal device.

At step S602, a positioning capability feedback message transmitted by the terminal device is received, in which the positioning capability feedback message includes positioning measurement capability information supported by the terminal device and state indication information of the terminal device.

Optionally, when the terminal device receives a positioning capability request message sent by the location management unit (LMF), it can provide feedback to the positioning server on the positioning capability it can support. For example, the terminal device can return a positioning capability feedback message, which includes the positioning measurement capability information supported by the terminal device and the state indication information of the terminal device. The state indication information can be understood as the current state of the terminal device, such as idle state/inactive state/connected state. When the location management unit (LMF) under the positioning server learns that the terminal device is in an inactive state, it can also send an activation request command to the terminal device, so that the terminal device can transmit the uplink SRS signal according to the SRS resource configuration configured by the service network device to achieve positioning measurement.

At step S603, SRS resource configuration transmitted by the service network device is received, in which the SRS resource configuration includes configuration information configured by the service network device configured for the terminal device to perform SRS-based positioning measurement in the inactive state.

At step S604, the SRS resource configuration is transmitted to the terminal device.

At step S605, an activation request command is transmitted to the terminal device, in which the activation request command is configured to indicate the terminal device to transmit the uplink SRS signal according to the SRS resource configuration.

It should be noted that there are multiple implementation methods for transmitting the activation request command. For example, the location management unit (LMF) can directly transmit the activation request command to the terminal device. Alternatively, the location management unit can transmit an SRS-based positioning measurement request to the service network device, so that the service network device can carry the activation request command through a paging message. Below are examples of these two methods described.

As an example, an SRS transmission activation request command transmitted by the location management unit (LMF) is received. That is to say, the location management unit (LMF) transmits the SRS activation request command to the terminal device, so that after receiving the SRS transmission activation request command, the terminal device transmits the uplink SRS signal according to the configured SRS resource configuration, avoiding resource waste.

As another example, the location management unit (LMF) transmit an SRS-based positioning measurement request to the service network device, so that the service network device transmits a first paging message to the terminal device after receiving the SRS-based positioning measurement request. The first paging message carries the SRS transmission activation request command. That is to say, the location management unit (LMF) transmits the SRS-based positioning measurement request to the service network device. The service network device carries the SRS transmission activation request command in the paging message, so that the terminal device can transmit the uplink SRS signal according to the configured SRS resource configuration after receiving the paging message, avoiding resource waste.

At step S606, an SRS-based positioning measurement request is transmitted to the service network device, and the SRS-based positioning measurement request and SRS resource configured are transmitted to an adjacent network device.

Optionally, the location management unit transmits the SRS-based positioning measurement request and SRS resource configuration to the service network device and adjacent network device to enable them to perform the SRS-based positioning measurement. This enables cellular network positioning technology to support the terminal device in an inactive state to perform the uplink positioning measurement, thereby improving the efficiency and performance of cellular network positioning measurement.

In some embodiments of the present disclosure, after completing the measurement, the location management unit may also transmit a deactivation request command to the terminal device, wherein the deactivation request command is configured to indicate the terminal device to stop transmitting the uplink SRS signal, thereby avoiding resource waste.

It should be noted that transmitting the deactivation request command can be implemented in multiple ways. For example, the location management unit (LMF) can directly transmit the deactivation request command to the terminal device. Alternatively, the location management unit (LMF) transmits a measurement stop command to the service network device, so that the service network device can carry the deactivation request command through a paging message. Below will provide examples of these two methods.

As an example, the location management unit directly transmits the deactivation request command to the terminal device. That is to say, the location management unit (LMF) transmits the SRS transmission deactivation request command to the terminal device, so that the terminal device stops transmitting the uplink SRS signal after receiving the SRS transmission deactivation request command, avoiding resource waste.

As another example, the location management unit LMF transmits the measurement stop command to the service network device, so that the service network device transmits a second paging message to the terminal device after receiving the SRS-based positioning measurement request, the second paging message carrying the deactivation request command. That is to say, the location management unit (LMF) transmits the SRS-based positioning measurement request to the service network device. The service network device carries the SRS transmission activation request command in the paging message, so that the terminal device stops transmitting the uplink SRS signal after receiving the paging message, avoiding resource waste.

In some embodiments of the present disclosure, the location management unit may also transmit positioning measurement stop request information to the service network device and adjacent service network device. That is to say, after completing the measurement, by transmitting the positioning measurement stop request information to the service network device and adjacent service network device, the service network device and adjacent service network device can stop positioning measurement, which can avoid resource waste.

It should be noted that the actual execution order of steps S601, S602, S603, S604, S605, and S606 mentioned above does not necessarily follow the order described above. That is to say, the steps described in S601, S602, S603, S604, S605, and S606 above are for the convenience of understanding by those skilled in the art and for description, and the actual execution order does not necessarily follow the order described above.

It can be understood that the above embodiments describe the implementation of the positioning measurement method of embodiments of the present disclosure from the terminal device and the location management unit (LMF). Embodiments of the present disclosure also propose another positioning measurement method, and the implementation of this positioning measurement method will be described below from the service network device. Please refer to FIG. 7, which is a schematic flowchart of another positioning measurement method provided in an embodiment of the present disclosure. It should be noted that the positioning measurement method of the present embodiment can be applied to a service network device. As shown in FIG. 7, the positioning measurement method may include but is not limited to the following steps.

At step S701, SRS resource configuration of a terminal device to perform SRS-based positioning measurement in an inactive state is configured.

In embodiments of the present disclosure, step S701 may be implemented in any way in respective embodiments of the present disclosure, and the embodiments of the present disclosure do not limit or elaborate on this.

At step S702, the configured SRS resource configuration is transmitted to a location management unit (LMF), so that the LMF transmits the SRS resource configuration to the terminal device, and the terminal device transmits an uplink SRS signal according to the SRS resource configuration.

In a possible implementation, while the terminal device is in a connected state, the service network device can also configure the SRS resource configuration to the terminal device through an RRC release message.

At step S703, SRS-based positioning measurement is performed.

By implementing this embodiment, the SRS resource configuration for the terminal device to perform the SRS-based positioning measurement in the inactive state is configured, and the configured SRS resource configuration is transmitted to the terminal device through the location management unit (LMF) in a transparent manner, so that the cellular network positioning technology can support the terminal device to perform uplink positioning measurement in an inactive state, thereby improving the efficiency and performance of cellular network positioning measurement.

Figure 8:
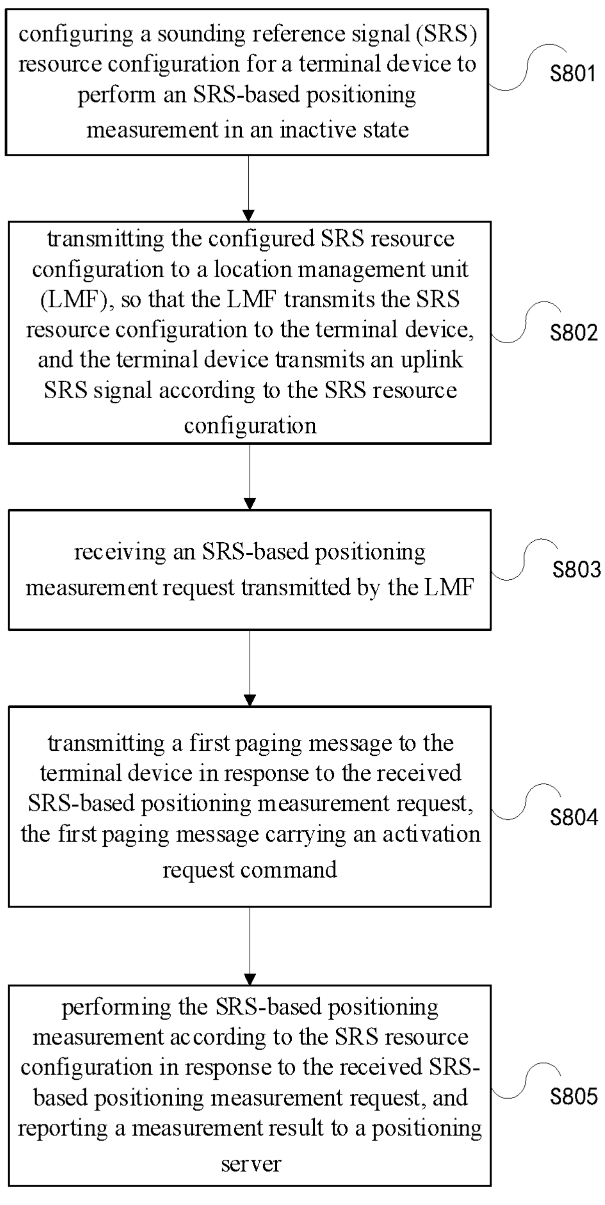
FIG. 8 is a schematic flowchart of another positioning measurement method provided in an embodiment of the present disclosure.

Please refer to FIG. 8. FIG. 8 is a schematic flowchart of another positioning measurement method provided in an embodiment of the present disclosure. It should be noted that the positioning measurement method of the present embodiment can be applied to a service network device. As shown in FIG. 8, this method may include but is not limited to the following steps.

At step S801, SRS resource configuration for a terminal device to perform SRS-based positioning measurement in an inactive state is configured.

At step S802, the configured SRS resource configuration is transmitted to a location management unit (LMF), so that the LMF transmits the SRS resource configuration to a terminal device, and the terminal device transmits an uplink SRS signal according to the SRS resource configuration.

At step S803, an SRS-based positioning measurement request transmitted by the LMF is received.

At step S804, in response to the received SRS-based positioning measurement request, a first paging message is transmitted to the terminal device, the first paging message carrying an activation request command, wherein the activation request command is configured to indicate the terminal device to uplink an uplink SRS signal according to the SRS resource configuration.

At step S805, in response to the received SRS-based positioning measurement request, SRS-based positioning measurement is performed according to the SRS resource configuration, and a measurement result is reported to a positioning server.

In some embodiments of the present disclosure, after completing the measurement, the service network device may also receive a measurement stop command transmitted by the location management unit (LMF), and in response to the received measurement stop command, transmit the second paging message to the terminal device, the second paging message carrying a deactivation request command. The deactivation request command is configured to indicate the terminal device to stop transmitting the uplink SRS signals. From this, it can be seen that by carrying the deactivation request command in the paging message, the terminal device stops transmitting the uplink SRS signal after receiving the deactivation request command, avoiding resource waste.

In some embodiments of the present disclosure, after completing the measurement, it is also possible to receive positioning measurement stop request information transmitted by the LMF. That is to say, after completing the measurement, LMF can transmit the positioning measurement stop request information to the service network device and adjacent service network device, so that the service network device and adjacent service network device can stop positioning measurement, which can avoid resource waste.

It should be noted that the actual execution order of steps S801, S802, S803, S804, and S805 mentioned above does not necessarily follow the order described above. That is to say, the steps described in steps S801, S802, S803, S804, and S805 are for the convenience of understanding by those skilled in the art and for convenience of description, and the actual execution order does not necessarily follow the order described above.

By implementing this embodiment, the SRS resource configuration for the terminal device to perform SRS-based positioning measurement in an inactive state is configured, and the configured SRS resource configuration is transmitted to the terminal device through the location management unit (LMF) in a transparent manner, so that the cellular network positioning technology can support the terminal device to perform uplink positioning measurement in an inactive state, thereby improving the efficiency and performance of cellular network positioning measurement, and avoiding resource waste.

In the above embodiments of the present disclosure, the methods provided are introduced from the perspectives of terminal device, location management unit (LMF), and service network device. In order to achieve the various functions of the methods provided in the embodiments of the present disclosure, the terminal device, location management unit (LMF), and service network device may include hardware structure, software module, or hardware structure plus software module to achieve the above functions. One of the above functions can be executed in the form of hardware structure, software module, or hardware structure plus software module.

Figure 9:
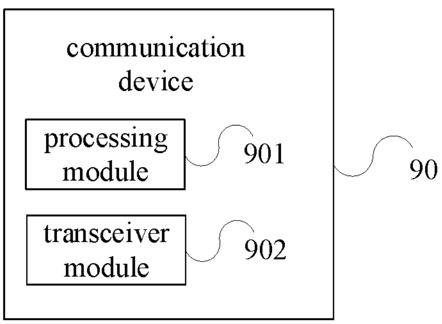
FIG. 9 is a block diagram of a communication device provided in an embodiment of the present disclosure.

Please refer to FIG. 9, which is a schematic block diagram of a communication device provided in an embodiment of the present disclosure. The communication device 90 shown in FIG. 9 may include a transceiver module 901. The transceiver module 901 may include a transmitting module and/or a receiving module, the transmitting module for implementing the transmitting function, and the receiving module for implementing the receiving function. The transceiver module 901 can implement the transmitting and/or receiving function. The communication device 90 shown in FIG. 9 may further include a processing module 902. The processing module 902 may be a processor.

It should be noted that the communication device 90 of the present embodiment may be a terminal device, a device within the terminal device, or a device that can be matched and used with the terminal device. Alternatively, the communication device 90 may be a location management unit (LMF), a device within the location management unit (LMF), or a device that can be matched and used with the location management unit (LMF).

The communication device 90 is the terminal device. In embodiments of the present disclosure, the transceiver module 901 is configured to transmit an uplink sounding reference signal (SRS) signal, according to an SRS resource configuration configured by a service network device for the terminal device to perform an SRS-based positioning measurement in an inactive state, so that the service network device and an adjacent service network device perform the SRS-based positioning measurement.

In an implementation, the SRS resource configuration is configured by the service network device for the terminal device via a radio resource control (RRC) connection release message when the terminal device is in a connected state. That is to say, after the service network device establishes an RRC connection with the terminal device, it directly transmits the SRS resource configuration to the terminal device.

In another implementation, the SRS resource configuration is configured by the service network device and transmitted to the location management unit (LMF), and transmitted by the LMF to the terminal device.

In some embodiments of the present disclosure, the transceiver module 901 is specifically configured to: receive a positioning capability request message transmitted by a location management unit (LMF); and transmit a positioning capability feedback message to a positioning server in response to the positioning capability request message, wherein the positioning capability feedback message comprises positioning measurement capability information supported by the terminal device and state indication information of the terminal device.

In an implementation, the transceiver module 901 is further configured to: receive an SRS transmission activation request command in the inactive state; transmit the uplink SRS signal according to the SRS resource configuration, in response to the received SRS transmission activation request command.

Optionally, the transceiver module 901 is specifically configured to receive the SRS transmission activation request command transmitted by the location management unit (LMF).

Optionally, the transceiver module 901 is specifically configured to: receive a first paging message transmitted by the service network device, wherein the first paging message carries the SRS transmission activation request command; wherein the first paging message is transmitted by the service network device after receiving an SRS-based positioning measurement request transmitted by the location management unit (LMF).

In some embodiments of the present disclosure, the transceiver module 901 is further configured to: receive an SRS transmission deactivation request command; and stop transmitting the uplink SRS signal in response to the received SRS transmission deactivation request command.

Optionally, the transceiver module 901 is specifically configured to receive the SRS transmission deactivation request command transmitted by the location management unit (LMF).

Optionally, the transceiver module 901 is configured to receive a second paging message transmitted by the service network device, wherein the second paging message carries the SRS transmission deactivation request command; wherein the second paging message is transmitted by the service network device after receiving a measurement stop command transmitted by the location management unit (LMF).

Regarding the device in the above embodiments, the specific ways in which each module performs operations have been described in detail in the embodiments related to the method, and will not be elaborated here.

The communication device 90 is a location management unit (LMF). In embodiments of the present disclosure, the transceiver module 901 is configured to receive a sounding reference signal (SRS) resource configuration transmitted by a service network device, and transmit the SRS resource configuration to a terminal device, so that the terminal device transmits an uplink SRS signal according to the SRS resource configuration in an inactive state, wherein the SRS resource configuration is configuration information configured by the service network device for the terminal device to perform an SRS-based positioning measurement in the inactive state.

In an implementation, the transceiver module 901 is further configured to: transmit a positioning capability request message to the terminal device; and receive a positioning capability feedback message transmitted by the terminal device, wherein the positioning capability feedback message includes positioning measurement capability information supported by the terminal device and state indication information of the terminal device.

In an implementation, the transceiver module 901 is further configured to: transmit an activation request command to the terminal device, wherein the activation request command is configured to indicate the terminal device to transmit the uplink SRS signal according to the SRS resource configuration.

In an implementation, the transceiver module 901 is further configured to: transmit an SRS-based positioning measurement request to the service network device, so that the service network device transmits a first paging message to the terminal device after receiving the SRS-based positioning measurement request, the first paging message carrying an activation request command, wherein the activation request command is configured to indicate the terminal device to transmit the uplink SRS signal according to the SRS resource configuration.

In an implementation, the transceiver module 901 is further configured to: transmit an SRS-based positioning measurement request to the service network device, and transmit the SRS-based positioning measurement request and the SRS resource configuration to an adjacent service network device.

In an implementation, the transceiver module 901 is further configured to: transmit a deactivation request command to the terminal device, wherein the deactivation request command is configured to indicate the terminal device to stop transmitting the uplink SRS signal.

In an implementation, the transceiver module 901 is further configured to: transmit a measurement stop command to the service network device, so that the service network device transmits a second paging message to the terminal device after receiving the measurement stop command, the second paging message carrying a deactivation request command, wherein the deactivation request command is configured to indicate the terminal device to stop transmitting the uplink SRS signal.

In an implementation, the transceiver module 901 is further configured to: transmit positioning measurement stop request information to the service network device and an adjacent service network device.

The communication device 90 is a service network device. In embodiments of the present disclosure, the a processing module 902 is configured to configure a sounding reference signal (SRS) resource configuration for a terminal device to perform an SRS-based positioning measurement in an inactive state. The transceiver module 901 is configured to transmit the configured SRS resource configuration to a location management unit (LMF), so that the LMF transmits the SRS resource configuration to the terminal device, and the terminal device transmits an uplink SRS signal according to the SRS resource configuration, wherein the processing module 902 is further configured to perform the SRS-based positioning measurement.

According to some embodiments of the present disclosure, the transceiver module 901 is further configured to: receive an SRS-based positioning measurement request transmitted by the LMF; transmit a first paging message to the terminal device in response to the received SRS-based positioning measurement request, the first paging message carrying an activation request command, wherein the activation request command is configured to indicate the terminal device to transmit the uplink SRS signal according to the SRS resource configuration.

According to some embodiments of the present disclosure, the processing module 902 is specifically configured to: perform the SRS-based positioning measurement according to the SRS resource configuration in response to the received SRS-based positioning measurement request, and report a measurement result to a positioning server.

According to some embodiments of the present disclosure, the transceiver module 901 is further configured to: receive a measurement stop command transmitted by the LMF; transmit a second paging message to the terminal device in response to the received measurement stop command, the second paging message carrying a deactivation request command, wherein the deactivation request command is configured to indicate the terminal device to stop transmitting the uplink SRS signal.

According to some embodiments of the present disclosure, the transceiver module 901 is further configured to: receive positioning measurement stop request information transmitted by the LMF Regarding the device in the above embodiments, the specific ways in which each module performs operations have been described in detail in the embodiments related to the method, and will not be elaborated here.

By implementing the embodiments of the present disclosure, the terminal device can carry the state indication information of the terminal device in the positioning capability feedback message when responding to the positioning server with the supported positioning measurement capability, so that the positioning server can understand the current state of the terminal device.

Figure 10:
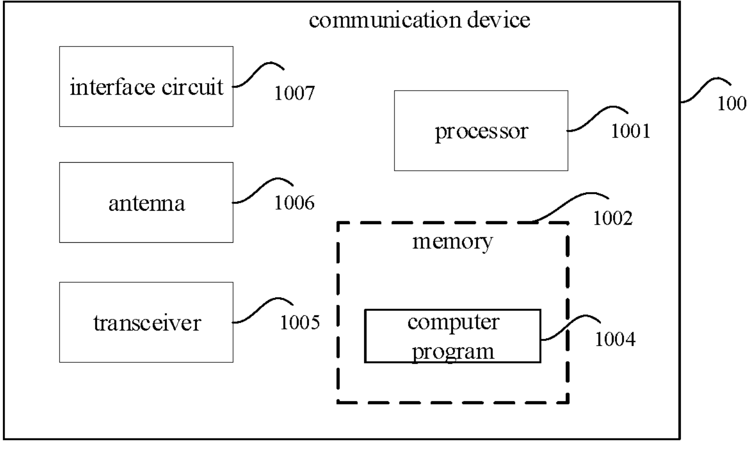
FIG. 10 is a schematic diagram of a communication device provided in an embodiment of the present disclosure.

Please refer to FIG. 10, which is a block diagram of a communication device provided in an embodiment of the present disclosure. The communication device 100 may be a terminal device or a location management unit (LMF), or may be a service network device. The specific form of the communication device may be a chip, chip system, processor, etc. that implements the above method. This device can be configured to implement the methods described in the above method embodiments, as described in the above method embodiments.

The communication device 100 may include one or more processor 1001. The processor 1001 may be a general-purpose processor, a dedicated processor, or the like. For example, it may be a baseband processor or a central processing unit. The baseband processor can be used to process communication protocols and data, while the central processor can be used to control communication devices (such as base stations, baseband chips, terminal devices, terminal device chips, DU or CU, etc.), execute computer programs, and process data from computer programs.

Optionally, the communication device 100 may also include one or more memory 1002, on which computer program 1004 may be stored, and the processor 1001 may execute the computer program 1004 to cause the communication device 100 to execute the method described in the above method embodiments. Optionally, the memory 1002 may also store data. The communication device 100 and the memory 1002 may be set separately or integrated together.

Optionally, the communication device 100 may also include a transceiver 1009 and an antenna 1006. The transceiver 1009 can be referred to as a transceiver unit, transceiver, or transceiver circuit, etc., used to achieve transceiver functions. The transceiver 1009 may include a receiver and a transmitter, and the receiver can be referred to as a receiving machine or a receiving circuit, etc., for achieving reception functions; the transmitter can be referred to as a transmission machine or transmission circuit, etc., for achieving transmission functions.

Optionally, the communication device 100 may also include one or more interface circuits 1007. The interface circuit 1007 is configured to receive code instructions and transmit them to the processor 1001. The processor 1001 runs the code instructions to cause the communication device 100 to execute the method described in the above method embodiments.

The communication device 100 is a terminal device, and the transceiver is used to execute steps S201 in FIG. 2; steps S301, S302 and S303 in FIG. 3; steps S401, S402, S403 and S404 in FIG. 4.

The communication device 100 is a location management unit (LMF), and the transceiver is used to execute steps S501 and S502 in FIG. 5, steps S601, S602, S603, S604, S605 and S606 in FIG. 6.

The communication device 100 is a service network device, and the transceiver is used to execute step S702 in FIG. 7; steps S802, S803, S804 and S805 in FIG. 8, and the processor is used to execute steps S701 and S703 in FIG. 7; step S801 in FIG. 8.

In one implementation, the processor 1001 may include a transceiver for implementing sending and receiving functions. For example, the transceiver may be a transceiver circuit, an interface, or an interface circuit. The transceiver circuits, interfaces, or interface circuits used to achieve receiving and sending functions can be separate or integrated together. The above-mentioned transceiver circuit, interface or interface circuit can be used for reading and writing code/data, or the aforementioned transceiver circuit, interface or interface circuit can be used for signal transmission or transfer.

In one implementation, the memory 1002 may store a computer program 1004, which runs on the processor 1001 and can cause the communication device 100 to execute the method described in the above method embodiments. The computer program 1004 may be embedded in the processor 1001, in which case the processor 1001 may be implemented by hardware.

In one implementation, the communication device 100 may include a circuit that can achieve the functions of sending, receiving, or communicating in the aforementioned method embodiments. The processor and transceiver described in this disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and transceiver can also be manufactured using various IC process technologies, such as complementary metal oxide semiconductor (CMOS), N-type metal oxide semiconductor (NMOS), P-type metal oxide semiconductor (PMOS), bipolar junction transistor (BJT) Bipolar CMOS (BiCMOS), silicon germanium (SiGe), gallium arsenide (GaAs), etc.

The communication device described in the above embodiments may be a terminal device or a network side device, but the scope of the communication device described in this application is not limited to this, and the structure of the communication device may not be limited by FIG. 8. The communication device may be an independent device or may be part of a larger device. For example, the communication device may be:

(1) independent integrated circuit IC, or chip, or chip system or subsystem;

(2) a set of one or more ICs, optionally including storage components for storing data and computer programs;

(3) ASIC, such as a modem;

(4) a module that can be embedded in other devices;

(5) a receiver, terminal device, intelligent terminal device, cellular phone, wireless device, handheld device, mobile unit, on-board device, cloud device, artificial intelligence device, etc;

(6) others and so on.

Those skilled in the art can also understand that the various illustrative logical blocks and steps listed in the embodiments of the present disclosure can be implemented through electronic hardware, computer software, or a combination of the two. Whether such functions are implemented through hardware or software depends on the specific application and design requirements of the whole system. Technicians in this field can use various methods to achieve the described functions for each specific application, but this implementation should not be understood as exceeding the scope of protection in the embodiments of this disclosure.

The present disclosure further provides a readable storage medium on which instructions are stored, which, when executed by a computer, implement the functions of any of the above method embodiments.

In the above embodiments, it can be fully or partially implemented through software, hardware, firmware, or any combination thereof. When implemented using software, it can be fully or partially implemented in the form of computer program products. The computer program product includes one or more computer programs. When loading and executing the computer program on the computer, all or part of the processes or functions described in the embodiments of the present disclosure are generated. The computer may be a general-purpose computer, a specialized computer, a computer network, or other programmable devices. The computer program can be stored in a computer-readable storage medium or transmitted from one computer-readable storage medium to another, for example, the computer program may be transmitted from a website, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium may be any available medium that the computer can access, or a data storage device such as a server or data center that includes one or more available media integrations. The available media may be magnetic media (such as floppy disks, hard drives, magnetic tapes), optical media (such as high-density digital video discs (DVDs)), or semiconductor media (such as solid state disks (SSDs)), etc.

Ordinary technical personnel in this field can understand that the first, second, and other numerical numbers involved in this disclosure are only for the convenience of description and differentiation, and are not used to limit the scope of the embodiments of this disclosure, but also indicate the order.

"At least one" of the present disclosure may also be described as one or more, and multiple may be two, three, four, or more, without limitation in this disclosure. In the embodiment of this disclosure, for a kind of technical feature, the technical features in this kind are distinguished by "first" and "second", in which the technical features described in "first" and "second" do not have any order of sequence or magnitude.

The correspondence relationships shown in the various tables in this application may be configured or predefined. The predefined terms in this application can be understood as defined, pre-defined, stored, pre-stored, pre-negotiated, pre-configured, solidified, or pre-fired.

Ordinary technical personnel in this field may realize that the units and algorithm steps of each example described in conjunction with the disclosed embodiments can be implemented in electronic hardware, or a combination of computer software and electronic hardware. Whether these functions are executed in hardware or software depends on the specific application and design constraints of the technical solution. Professional technicians may use different methods to implement the described functions for each specific application, but such implementation should not be considered beyond the scope of this application.

Technicians in the art can clearly understand that for the convenience and conciseness of the description, the specific working processes of the system, device, and unit described above can refer to the corresponding processes in the aforementioned method embodiments, and will not be repeated here.

The above is only the specific implementation of this application, but the scope of protection of this application is not limited to this. Any technical personnel familiar with this technical field can easily think of changes or replacements within the scope of technology disclosed in this application, which should be covered within the scope of protection of this application. Therefore, the protection scope of this application should be based on the protection scope of the claims.

What is claimed is:

1. A positioning measurement method, performed by a terminal device, the method comprising:

receiving a first paging message transmitted by a service network device, the first paging message carrying an activation request command, and the activation request command being configured to indicate the terminal device to transmit an uplink sounding reference signal (SRS) according to an SRS resource configuration, wherein the first paging message is transmitted by the service network device to the terminal device after receiving an SRS-based positioning measurement request transmitted by a location management unit (LMF); and transmitting the uplink SRS in response to the received activation request command, according to an SRS resource configuration configured by the service network device for the terminal device to perform an SRS-based positioning measurement in an inactive state, so that the service network device and an adjacent service network device perform the SRS-based positioning measurement.

2. The method of claim 1, further comprising:

receiving a positioning capability request message transmitted by a location management unit (LMF); and transmitting a positioning capability feedback message to a positioning server in response to the positioning capability request message, wherein the positioning capability feedback message comprises positioning measurement capability information supported by the terminal device and state indication information of the terminal device.

3. The method of claim 1, wherein the SRS resource configuration is configured by the service network device for the terminal device via a radio resource control (RRC) connection release message when the terminal device is in a connected state; or wherein the SRS resource configuration is configured by the service network device and transmitted to a location management unit (LMF), and transmitted by the LMF to the terminal device.

4. The method of claim 1, further comprising:

receiving an SRS transmission deactivation request command; and stopping transmitting the uplink SRS in response to the received SRS transmission deactivation request command.

5. The method of claim 4, wherein receiving the SRS transmission deactivation request command comprises:

receiving the SRS transmission deactivation request command transmitted by a location management unit (LMF); or receiving a second paging message transmitted by the service network device, wherein the second paging message carries the SRS transmission deactivation request command;

wherein the second paging message is transmitted by the service network device after receiving a measurement stop command transmitted by the LMF.

6. A positioning measurement method, performed by a location management unit (LMF), the method comprising:

transmitting an sounding reference signal (SRS)-based positioning measurement request to a service network device, so that the service network device transmits a first paging message to a terminal device after receiving the SRS-based positioning measurement request, the first paging message carrying an activation request command, wherein the activation request command is configured to indicate the terminal device to transmit an uplink SRS according to an SRS resource configuration;

receiving the SRS resource configuration transmitted by the service network device, wherein the SRS resource configuration is configuration information configured by the service network device for the terminal device to perform an SRS-based positioning measurement in an inactive state; and transmitting the SRS resource configuration to the terminal device, so that the terminal device transmits the uplink SRS according to the SRS resource configuration in the inactive state.

7. The method of claim 6, further comprising:

transmitting a positioning capability request message to the terminal device; and receiving a positioning capability feedback message transmitted by the terminal device, wherein the positioning capability feedback message comprises positioning measurement capability information supported by the terminal device and state indication information of the terminal device.

8. The method of claim 6, further comprising:

transmitting the SRS-based positioning measurement request and the SRS resource configuration to an adjacent service network device.

9. The method of claim 6, further comprising:

transmitting a deactivation request command to the terminal device, wherein the deactivation request command is configured to indicate the terminal device to stop transmitting the uplink SRS.

10. The method of claim 6, further comprising:

transmitting a measurement stop command to the service network device, so that the service network device transmits a second paging message to the terminal device after receiving the measurement stop command, the second paging message carrying a deactivation request command, wherein the deactivation request command is configured to indicate the terminal device to stop transmitting the uplink SRS.

11. The method of claim 6, further comprising:

transmitting positioning measurement stop request information to the service network device and an adjacent service network device.

12. A positioning measurement method, performed by a service network device, the method comprising:

configuring a sounding reference signal (SRS) resource configuration for a terminal device to perform an SRS-based positioning measurement in an inactive state;

transmitting the configured SRS resource configuration to a location management unit (LMF), so that the LMF transmits the SRS resource configuration to the terminal device, and the terminal device transmits an uplink SRS according to the SRS resource configuration;

receiving an SRS-based positioning measurement request transmitted by the LMF; and transmitting a first paging message to the terminal device in response to the received SRS-based positioning measurement request, the first paging message carrying an activation request command, wherein the activation request command is configured to indicate the terminal device to transmit the uplink SRS according to the SRS resource configuration; and performing the SRS-based positioning measurement.

13. The method of claim 12, wherein performing the SRS-based positioning measurement comprises:

performing the SRS-based positioning measurement according to the SRS resource configuration in response to the received SRS-based positioning measurement request, and reporting a measurement result to a positioning server.

14. The method of claim 12, further comprising:

receiving a measurement stop command transmitted by the LMF; and transmitting a second paging message to the terminal device in response to the received measurement stop command, the second paging message carrying a deactivation request command, wherein the deactivation request command is configured to indicate the terminal device to stop transmitting the uplink SRS.

15. The method of claim 12, further comprising:

receiving positioning measurement stop request information transmitted by the LMF.

* * * * *